United States Patent [19]
Buffington et al.

[11] 4,134,207
[45] Jan. 16, 1979

[54] CAN BEAD CUTTING DEVICE

[76] Inventors: Samuel E. Buffington, 1980 Chipper Dr., Edgewood, Md. 21040; Earl K. Skidmore, 1527 Becklow Ave., Baltimore, Md. 21220

[21] Appl. No.: 830,610

[22] Filed: Sep. 6, 1977

[51] Int. Cl.² .............................................. B23B 1/00
[52] U.S. Cl. ...................................................... 30/433
[58] Field of Search .......... 113/1 F, 1 R, 1 D, 121 R, 113/120 R, 116 QA, 120 M, 120 BB; 30/417, 433; 83/596

[56] References Cited
U.S. PATENT DOCUMENTS 1,365,405  1/1921  Howard ................................. 30/433
3,880,026  4/1975  Adamson .......................... 30/433 X Primary Examiner—Leon Gilden
Attorney, Agent, or Firm—J. Wesley Everett

[57] ABSTRACT

A top bead cutting and removal device and method for removing at least a part of the top bead of the cap connecting the top with the body portion of a can as associated with commonly constructed can beads for the purpose of determining the amount of fold-over associated with the construction of the cans for the purpose of quality control of the manufacturing process. The device of this invention is provided with a rotatable chuck member having extending therefrom a cutting knife which is adjustably mounted from the rotatable support for the purpose of suitably removing an intermediate part of the top bead to sever the outer fold-over portion of the can top bead from the top itself. Also mounted from the rotatable chuck member are displacement rollers for effecting a longitudinal movement along the can body of the remaining severed portion of the bead of the end cap after the severance thereof.

4 Claims, 11 Drawing Figures

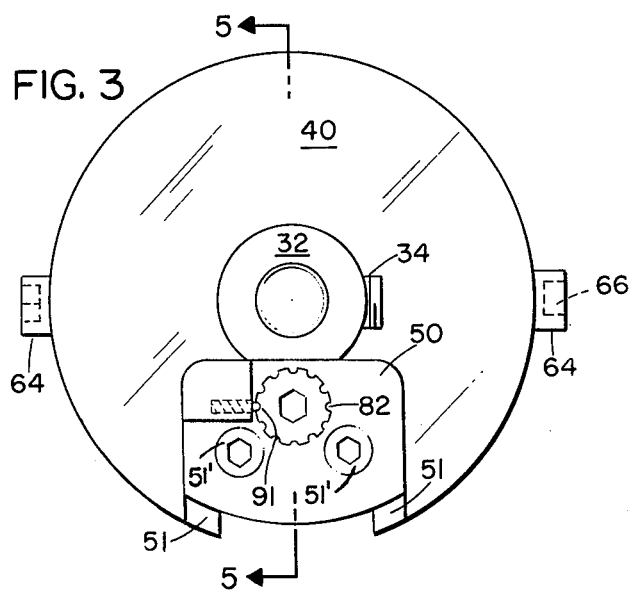
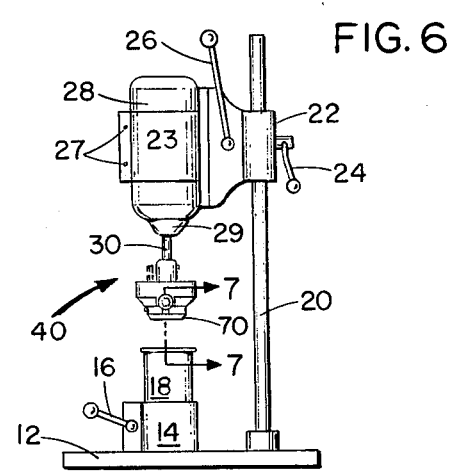
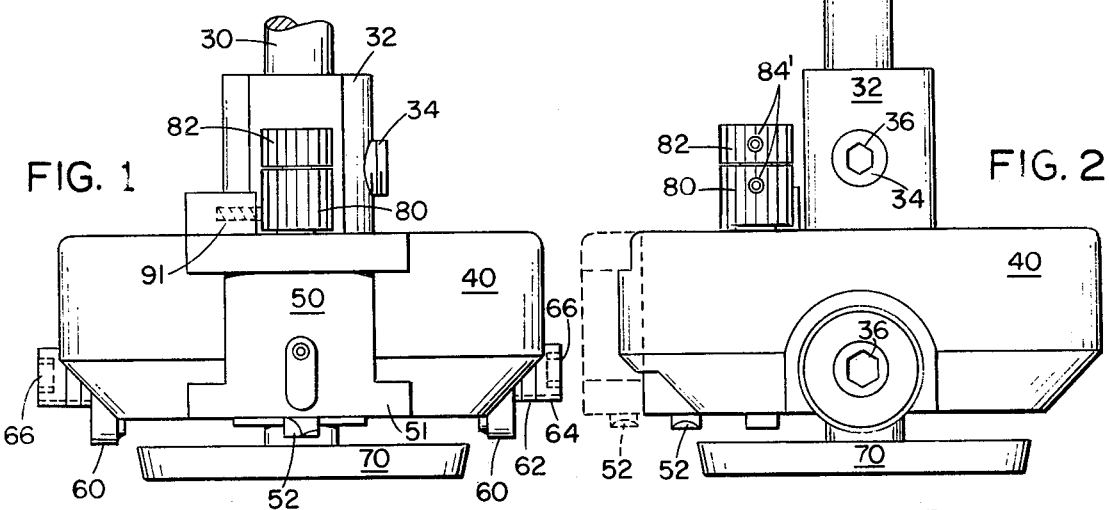
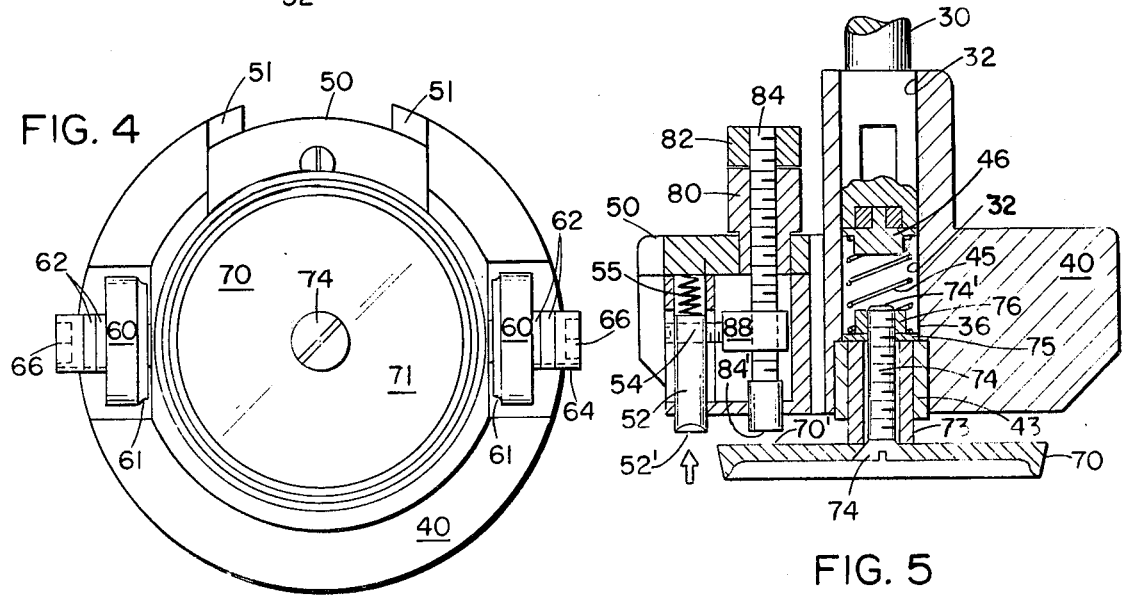

CAN BEAD CUTTING DEVICE

BACKGROUND OF THE INVENTION

1. Field of the Invention

This invention relates generally to devices and method for cutting a portion of the bead normally formed on the ends of cans during the construction thereof and specifically for the purpose of accurately severing a desired amount of said bead with a longitudinal displacement of the remaining portion for the purpose of providing a desired amount of bead ring which may be accurately measured to determine if the quality control of the manufacturing process is of the desired standard.

2. Description of the Prior Art

A common problem with the making of cans of cylindrical form having separate end members secured thereto by a manufacturing process which involves the interfolding of the outer periphery of the end member with the associated ends of the can cylindrical body is that it is not easy to assure that the proper amount of overlap is present between the folds. Known type devices for measuring the degree of overlap have not been as satisfactory as they may be.

A common problem with devices for checking the desired amount of overlap in can construction is that when the beaded folded portion is severed and partially removed, unless the severing operation has been performed with a high degree of accuracy, there is no way of knowing whether the remaining portion which is measured is a true reflection of the desired amount of bead overlap or not.

None of the known prior art devices offers the new and unique features of the invention disclosed herein.

A SUMMARY OF THE INVENTION

An object of the present invention is to provide a device and a method for severing the formed connecting bead between cylindrical can bodies and their respective ends.

Another object of the present invention is to provide an accurately adjustable cutting and severing device for removing a portion of the formed interlocking bead on can ends to permit the removal of ends from the cylindrical body thereof to provide a remaining portion of the formed bead structure which may be accurately measured for quality control purposes.

A further object of this invention is to provide a can bead severing structure together with positive displacement rollers for the purpose of moving a portion of the severed bead longitudinally of the can body and prevent further destroying thereof prior to appropriate quality measurement thereof.

A still further object of this invention is to provide a relatively simple and inexpensive device which may be used on conventional type drill presses or the like for rotating the said cutting and severing device for removing a portion of the can bead in order that the interlocking bead structure of formed can ends and their attached ends may be checked for the purpose of quality control.

The device of this invention offers a number of new and unique features not hitherfore found in the art. The basic device is usable with conventional type drill presses and the like and consists of a primary body member of generally round chuck-like configuration having adjustably mounted therewith a knife blade of suitable construction for severing metal beads as normally found on the ends of cans when the ends of said cans are attached to the cylindrical bodies thereof. The accurately adjustable knife permits desired severing of the formed bead in a quite accurate manner with only the desired and necessary amount being cut. Together with this structure and also mounted from the chuck-like body member are two oppositely disposed roller members rotatably supported about appropriate axes substantially perpendicular to the central axis of the device, for the purpose of positively displacing the remainder of the bead once its upper portion has been severed by the cutting knife of the device. These rollers positively displace the remainder of the bead along the side of the body portion of the can and positively prevent further cutting thereof.

Once the bead on the end cap has been appropriately separated by the knife, the remaining portion of the bead is displaced by the rollers, and the innermost lap of the end cap and, if desired, the outermost lap of the body member may be accurately measured to determine if the desired and required amount of overlap has been provided by the device and manufacturing process forming same. If not, then the appropriate quality control procedures can be followed to correct the error in the manufacturing process. Or similarly, if the amount of bead is up to the required standards, then manufacturing can proceed without any changes thereof and with assurance that the cans are being properly formed.

This is extremely important in both the manufacturing of cans and the sealing of the top end to the body of the can for sealing the contents therein because if the desired and required amount of bead overlap is not present then the can end may be blown out under unusually high pressure, or the can itself may develop a leak which in many type of use of the cans can be quite disastrous. For example, when cans are used for the purpose of containing beer, beer normally emitting gas and having an internal pressure within the can of substantial magnitude, if in the formed beads holding the ends of the can to the cylindrical body there is insufficient overlap of the formed bead structure, obviously the pressure built up in said can could cause the can to explode or rupture out the joints thereof. These together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of the drill attachment device of this invention.

FIG. 2 is a side elevational view of the device.

FIG. 3 is a top plan view.

FIG. 4 is a bottom plan view.

FIG. 5 is a side elevational view, partly in crosssection, taken generally along line 5—5 of FIG. 3.

FIG. 6 is a diagrammatic view of the device installed with a drill press.

DESCRIPTION OF THE PREFERRED EMBODIMENT

Figure 7:
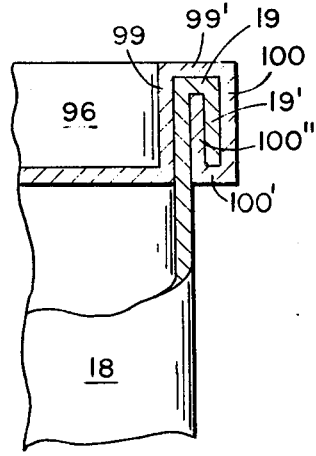
FIG. 7 is an enlarged fragmentary sectional view showing a top cap seamed to the upper end of a can body.

Referring to FIG. 6 of the drawings, reference numeral 40 indicates the chuck element of the invention as in use with a conventional type drill press structure. As may be seen in this view a base stand 12 normally supports an adjustable clamping structure 14 with a handle 16 for operation of the clamp. As used a can 18 is normally clamped and held by this structure. Fixed to the base 12 is a standard 20 which is normally provided with a sleeve 22 for adjustably supporting the drill press with adjusting handle 24 associated with the sleeve. The drill press may be supported by a clamp 23 secured by the bolts 27, or any other convenient means. Another handle 26 with appropriate rack and pinion provides for vertical movement of the drive motor 28. The motor 28 is equipped with the customary appropriate reduction drive gearing and driving clutch 29. Connecting the motor driving clutch 29 with the member 40 is a shaft 30 which will be referred to in more detail hereinafter.

As seen in FIGS. 1 and 2, the output shaft 30 is fastened into an aperture carried within a shank 32 of the device and secured therein by means of a set screw 34 having an allen wrench engaging recess 36 provided therewith. The shank 32 is integral with a round chuck member 40 which forms the primary body member of the device. Along one side of the chuck member 40 is provided a recess which receives therewithin an adjustable knife supporting structure 50. This knife supporting structure 50 has extending flanges 51 provided therewith for mating in a complementary manner with additional recesses provided in the main body member of chuck 40, and is secured in position by allen screws 51' best shown in FIGS. 3 and 4.

As seen in the view of FIG. 5, an adjustable knife 52 is spring biased by means of spring 55 and positively secured on a pin 54 fixed to a mounting member 88 which in turn has its opposite end threadably engaging a threaded screw 84 provided within the adjustable member 50. The screw 84 has an adjusting nut 80 mounted on the threads thereof together with a lock nut element 82. Small allen screws 84' (see FIG. 2) permit a secondary locking of both of the nuts 80 and 82 to the threaded stud 84. By adjusting these nuts 80 and 82 the screw 84 may be raised and lowered relative to the body portion 40 of the device which in turn raises and lowers the knife 52 wherein the knife 52 may be accurately adjusted with respect to the body member 40. This permits a very high degree of accuracy of the cutting steps to be described below.

The center of the main body member 40 is provided with a central aperture 32 which has a bottom bearing member 43 recessed in concentric alignment therewith. Also placed within the upper end of the aperture 32 is one end of the shaft 30 which is secured therein by the set screw 34. Extending below the bottom of the body member 40 is a disc-like member 70 and a shank portion 73 extending up into the bearing 43. This disc-like member 70 has two functions, it guides the device into the recess 96 in the top of the can and it acts to limit the cut of the knife 52. This disc member 70 is movable upwardly during the cutting operation on the top of a can, as shown in position in FIG. 5. As the member 70 is moved upwardly by the can top the upper surface of the member 70 engages the lower end 84' of the pin member 84 raising the knife which is attached to the pin 84 by the pin 54 and moving it against the tension of the spring 55 which will not allow the knife 52 to go any deeper into the bead of the can.

The disc-like member 70 will stop rotating when it comes in contact with the can top, and the bearing 43 will allow the chuck 40 to continue to rotate.

The member 70 is held within the aperture 32 by a washer 75 resting on the inner edge of the bearing 43 and a nut 76 threaded on the inner end of a screw 74 and into the nut 76.

The aperture 32 within the chuck 40 is of such length and arranged so as to provide a space between the inner end of the shaft 30 and the inner end 74' of the screw member 74 secured to the member 70. Within this space there is a bearing 46 positioned on the inner end of the shaft 30 and rotatable relative to the end of the fixed shaft 30. Between the outer end of the bearing 46 and the collar 73 of the member 70 is the compression spring 45 which is adapted to urge the member 70 in contact with the can top.

Referring again to the threaded screw 84 and the nuts 80 and 82, there is a spring loaded pin 91 which prevents the screw 84 and the nuts 80 and 82 from being accidentally rotated which would throw the knife out of its delicate cutting position.

Mounted on an axis substantially perpendicular to the center axis of the device and substantially at right angles to the knife structure 52 are displacement rollers 60. These rollers 60 are suitably mounted by screws 64 secured by threads thereon, and threaded apertures (not shown) within the main body member and have allen wrench recesses 66 provided in the center of the heads thereof. Adjustment washers 62 also may be used for adjusting the radial distance of the rollers 60 with respect to the rotational axis of the main body member 40.

By referring to FIGS. 7 through 11 the operation of this device will now be described in detail. FIG. 7 shows an enlarged view of a standard double beaded can of the conventional type. The main body portion of this type can is cyclindrical in form having at least one of the lateral ends extending outwardly and parallel with the can body to form beaded portions 19 and 19' and is the type of bead the present apparatus is adapted to operate on.

Interlocking with the can body bead portions 19 and 19' are portions 99, 99', 100, 100' and 100" of the can body closure which is referred to as the top. These bead elements of the can body and the top are compressed to hermetically seal the can body 18 and the top 96.

Figure 8:
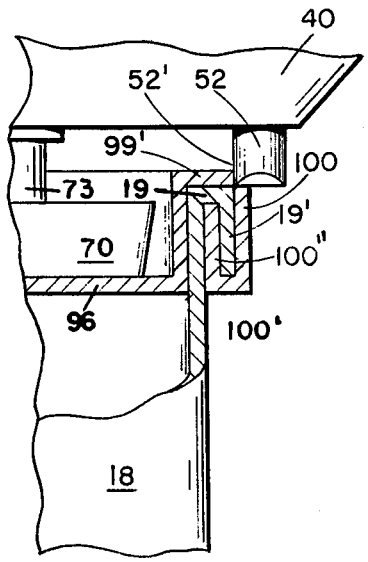
FIG. 8 is a view similar to FIG. 7 showing the part of the top cap portion partly removed as effected by use of the tool of this invention.
Figure 9:
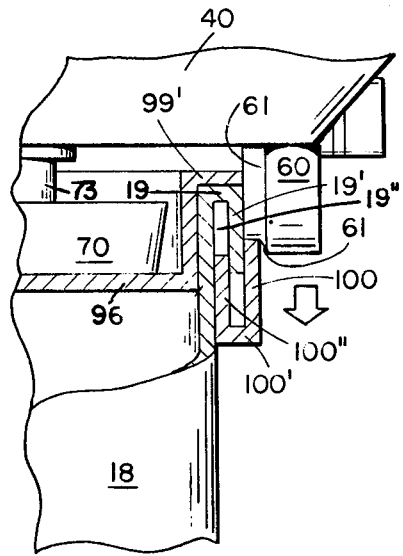
FIG. 9 is a fragmentary sectional view of the top end of a can showing the removal of the remaining portion of the top portion of the top seam.
Figure 10:
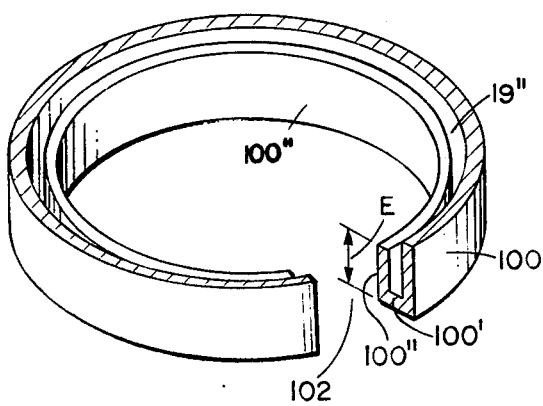
FIG. 10 shows the severed portion of the top bead after it has been removed from the can.
Figure 11:
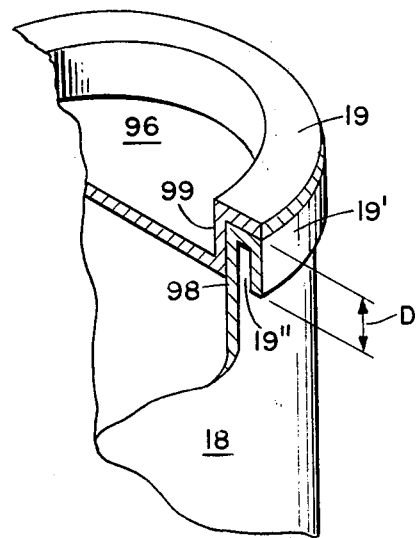
FIG. 11 shows the top of the can body after the top bead portion has been removed.

FIG. 8 shows the initial step of cutting away part of this double bead by use of this invention. The can 18 and the double bead are placed in upward position on the base 12 and within the clamp 14. The clamp will engage the can body preventing the rotation of the can by operation of the handle 16. The cutting device is lowered and brought into contact with the top of the can by operation of the handle 26. The first element of the cutting device to contact the can is the member 70 which holds the top of the can in proper position adjacent the cutting knife 52. The member 70 moves upwardly as the handle 26 is brought downwardly against the resistance of the compression spring 45 until the upper surface 70' comes into contact with the lower edge 84' of the cutter blade which limits the downward movement of the cutter knife 52, thereby limiting the cut on the seam. The knife 52 is adapted to remove only part of the edge 99' (see FIG. 8). This removed portion is completely eliminated and removed as the device is operated. Upon further downward movement of the tool and rotation thereof the groove 61 of the rollers 60 will come into engagement with the upper edge of the depending and severed bead portion 100 as seen in FIG. 9. The small recessed portions 61 of the rollers 60 will mate with and engage the upper portion of the bead portion 100 and positively push the bead portion 100, 100' and 100" downwardly along the can body 18 and away from the upper edge of the can. Then the drill press handle 26 is moved upwardly to withdraw the tool from the top of the can after which the can body 18 is removed from the clamp 14 (FIG. 6). After the can body has been removed from the clamp 14, the portions of the top bead 100 and 100' and 100" are removed from the can body 18 by severing it at some convenient point such as shown at 102 in FIG. 10, and removing the same from about the can body. After the removal of the top portion as shown in FIG. 10, the distance E of the upturned flange 100" may be conveniently measured by a suitable micrometer to see if this portion of the bead completely fills the space 19" between the can body and the downwardly turned flange 19'. Also the downwardly turned flange 19' of the can body as shown at D in FIG. 11 may also be measured to insure that the portions 19' of the body 18 extend fully within the space 19", and also to determine whether or not a sufficient amount of the can body is being supplied to this portion of the bead. Thus the necessary quality control measurement of the bead dimensions may be accurately accomplished at this point. If the amount of bead overlap is not up to required standards, appropriate adjustments can then be made in the manufacturing equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

We claim:

1. A device for removing at least part of the metal from a top U-shaped portion of a rolled end seam of a double seamed cylindrical can connecting the top with a side wall of a can body, comprising; a rotatable chuck, means on said rotatable chuck for adjustably fixing a rigid cutter blade over the seam connecting the top of the can with the can side wall for cutting away at least the upper outer portion of the top U-shaped seam lap positioned at the top of the can for separating the U-shaped outer lapped portion of the top seam from the remainder of the top portion of the seam, means for moving the outer severed portion of the top seam downwardly along the body of the can comprising at least one roller carried by the chuck positioned above said severed portion of the lap of the upper seam positioned to engage the severed portion of the U-shaped seam moving the same away from the unsevered portion thereof whereby the outer lap of metal of the end seam may be accurately measured for quality controlled purposes.

2. The structure as set forth in claim 1 wherein the further means for moving the severed portion of the top seam away from the unsevered portion thereof includes at least one roller cam member for engagement with the severed portion of the said top seam an appropriate distance along the can body.

3. The structure as set forth in claim 1 wherein the main body member is a round relatively thick member having a centrally extending shank protruding therefrom for engagement with a drive shaft of a drill press, said further means including at least two such roller members mounted on diametrically opposite sides of the round relatively thick body member.

4. The structure as set forth in claim 1 wherein the cutter knife is mounted on the main body member substantially midway between the roller members, said cutter blade being mounted in a slideable support structure, and a locking screw provided between the slideable support structure and the main body member, together with locking means for the locking screw.

* * * * *